United States Patent
Mukainakano et al.

(10) Patent No.: US 9,598,035 B2
(45) Date of Patent: Mar. 21, 2017

(54) IMPACT ABSORBER

(71) Applicant: Fuji Jukogyo Kabushiki Kaisha, Tokyo (JP)

(72) Inventors: Yuya Mukainakano, Tokyo (JP); Satoshi Ikeda, Tokyo (JP); Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/473,130

(22) Filed: Aug. 29, 2014

(65) Prior Publication Data
US 2015/0069774 A1 Mar. 12, 2015

(30) Foreign Application Priority Data
Sep. 11, 2013 (JP) .................. 2013-187809

(51) Int. Cl.
*F16F 7/12* (2006.01)
*B60R 19/26* (2006.01)
*B60R 19/03* (2006.01)
*B60R 19/34* (2006.01)

(52) U.S. Cl.
CPC ........... *B60R 19/26* (2013.01); *B60R 19/03* (2013.01); *B60R 19/34* (2013.01); *F16F 7/12* (2013.01); *F16F 7/123* (2013.01)

(58) Field of Classification Search
CPC ......... B60R 19/26; B60R 19/34; B60R 19/03; F16F 7/12; F16F 7/123
(Continued)

(56) References Cited

U.S. PATENT DOCUMENTS 3,082,846 A * 3/1963 Jensen ............... F16F 7/121
188/377
3,428,150 A * 2/1969 Muspratt ............. F16F 7/125
188/375
(Continued)

FOREIGN PATENT DOCUMENTS

JP 06-300068 10/1994
JP 06300067 A * 10/1994
(Continued)

OTHER PUBLICATIONS

Chinese Office Action for CN 201410447395 received on Mar. 21, 2016 (4 pages).
(Continued)

*Primary Examiner* — Thomas Irvin
(74) *Attorney, Agent, or Firm* — Smith, Gambrell & Russell LLP

(57) ABSTRACT

An impact absorber includes a energy absorbing member that is formed of a composite material obtained by reinforcing a resin with a fiber and absorbs impact energy by being crushed in a predetermined crush direction, and a pressing member that is disposed on the front side of the energy absorbing member and presses it in the crush direction to thereby crush the energy absorbing member. The energy absorbing member is configured by stacking, along a radial direction orthogonal to the crush direction, fiber layers having different elastic moduli to a load along the crush direction, and the front end portion of the energy absorbing member is inclined relative to a pressing surface of the pressing member such that the fiber layers are gradually brought into contact with the pressing member sequentially in ascending order of the elastic modulus as the energy absorbing member is pressed by the pressing member.

20 Claims, 8 Drawing Sheets

(58) Field of Classification Search
USPC .................................................. 188/371, 377
See application file for complete search history.

(56) References Cited

U.S. PATENT DOCUMENTS

| | | | | |
|---|---|---|---|---|
| 3,552,525 | A * | 1/1971 | Schudel | ................... F42B 10/14 |
| | | | | 188/377 |
| 6,406,088 | B1 * | 6/2002 | Tate | ...................... B62D 21/152 |
| | | | | 188/371 |
| 2010/0219032 | A1 * | 9/2010 | Kanemasu | .............. F16F 7/124 |
| | | | | 188/377 |

FOREIGN PATENT DOCUMENTS

| | | | | |
|---|---|---|---|---|
| JP | H6-307478 | | 11/1994 | |
| JP | H7-224874 | | 8/1995 | |
| JP | H8-177922 | | 7/1996 | |
| JP | H8-219215 | | 8/1996 | |
| JP | 10-235763 | A * | 9/1998 | ............... B32B 5/08 |
| JP | H10-235763 | | 9/1998 | |

OTHER PUBLICATIONS

US. Department of Transportation, Federal Aviation Administration. Chapter 7. Advanced Composite Materials. Aviation Maintenance Technician Handbook-Airframe vol. 1, 2012 pp. 7-1 to 7-58.
English Translation of Chinese Office Action for Cn 201410447395 dated Mar. 21, 2016 (4 pages).
Japanese Office Action for JP 2013-187809 dated Feb. 3, 2015 (Japanese with English Translation—6 pages).
Japanese Decision to Grant a Patent for JP 2013-187809 dated Aug. 7, 2015 (Japanese with English Translation—6 pages).

* cited by examiner

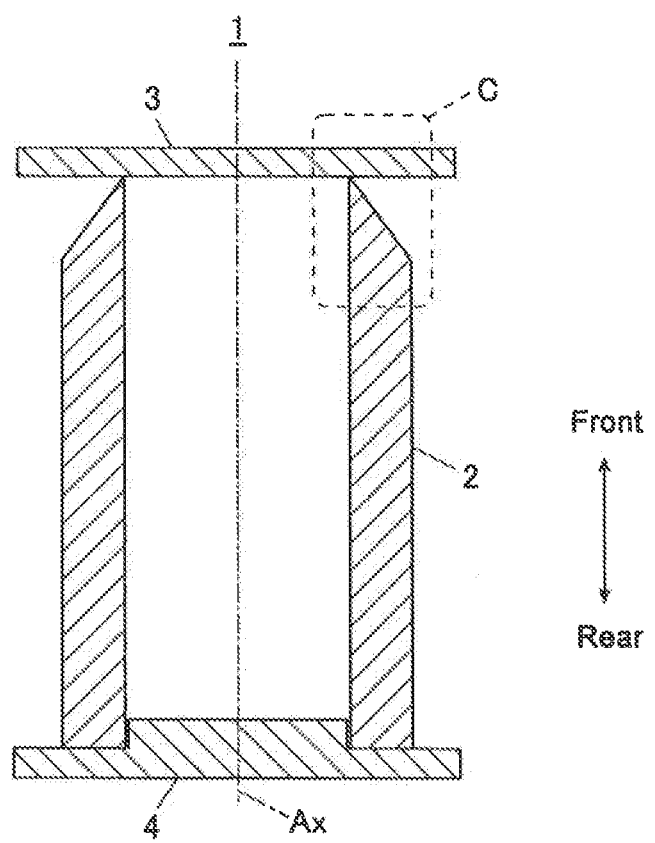

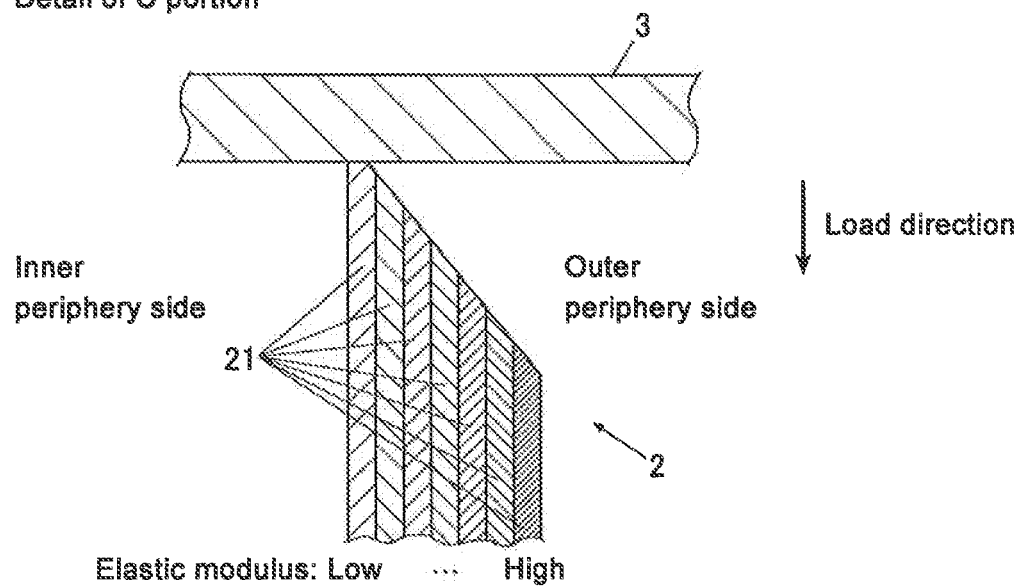

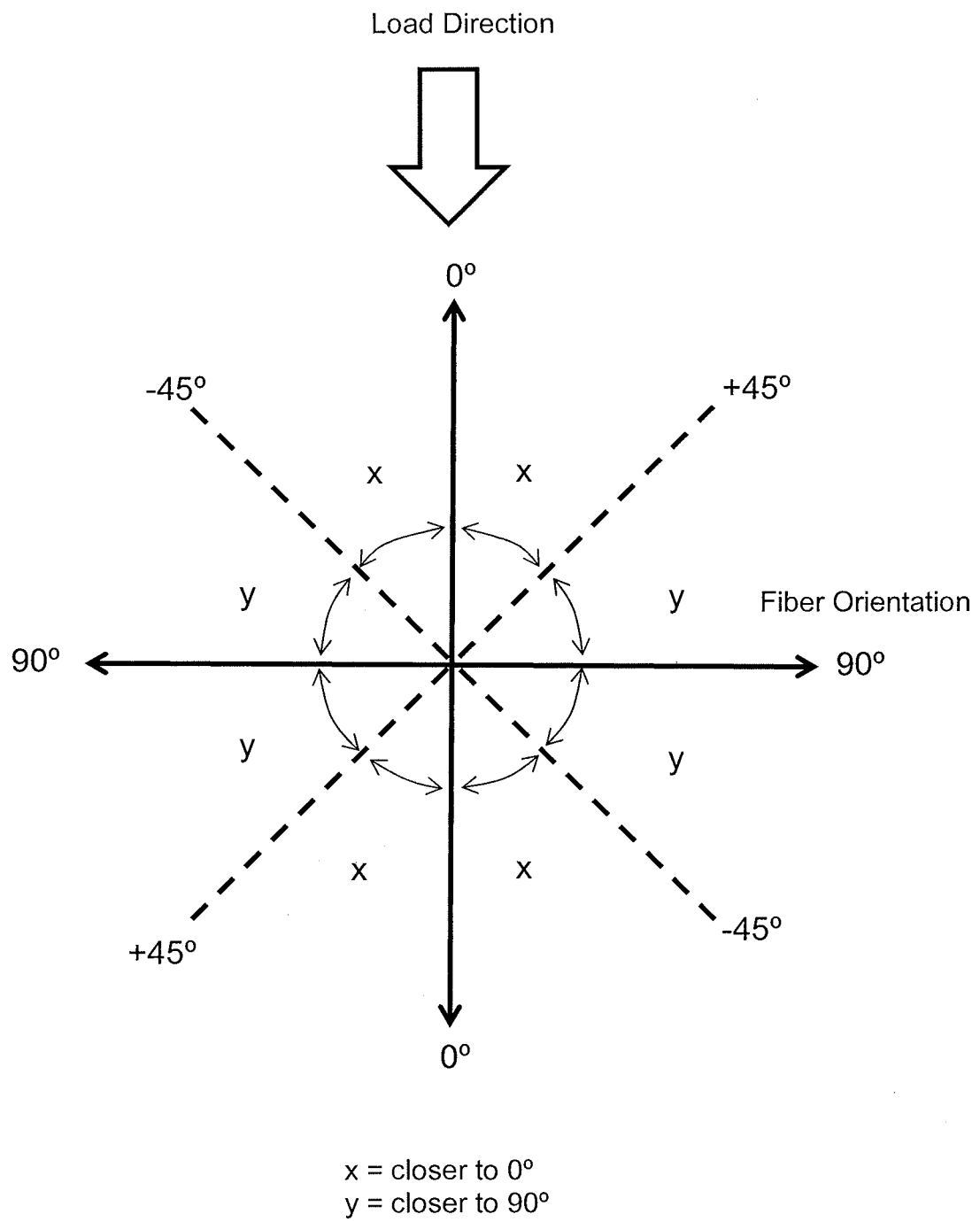

IMPACT ABSORBER

CROSS-REFERENCE TO RELATED APPLICATIONS

The present application claims priority from Japanese Patent Application No. 2013-187809 filed on Sep. 11, 2013, the entire contents of which are hereby incorporated by reference.

BACKGROUND

1. Technical Field

The present invention relates to an impact absorber that absorbs an impact at the time of a collision or the like, and relates to an impact absorber suitably used in, e.g., an automobile.

2. Related Art

An impact absorber that is mounted on, e.g., an automobile and absorbs an impact from the outside is conventionally known. In the impact absorber, an energy absorbing member formed in, e.g., a tubular shape receives an impact load and is longitudinally crushed, whereby the energy absorbing member absorbs the impact load (impact energy). Conventionally, an energy absorbing member made of a metal (e.g., aluminum alloy) is used as the energy absorbing member. However, in recent years, an energy absorbing member made of a composite material (e.g., fiber reinforced plastic) that has higher energy absorption performance and is lighter is developed and is becoming commercially practical.

Incidentally, in such an impact absorber, the elastic modulus of the energy absorbing member significantly influences the energy absorption performance.

For example, Japanese Unexamined Patent Application Publication (JP-A) No. H6-300068 proposes an energy absorbing member formed of a composite material having a layer structure in which a reinforced fiber having a high strength is used in an inner layer and a reinforced fiber having a high elastic modulus is used in an outer layer. According to the energy absorbing member described in JP-A No. H6-300068, it is possible to obtain excellent energy absorption performance such as a high resistance before a rupture occurs, stable energy absorption after the rupture, and a high strength against buckling.

However, in the energy absorbing member in which the reinforced fiber having a high strength (or a high elastic modulus) is used in the inner layer, in the case where the inner layer has received a load first, the energy absorbing member bears a large load while hardly being displaced in a crush direction. More specifically, in such a case, as illustrated in FIG. 5, the energy absorbing member displays a load-displacement characteristic having an uneven rise in which the peak of the load leading to the rupture of the inner layer is seen in an initial stage. Thus, in the case where the rise of the load-displacement characteristic is not smooth, there is a possibility that deterioration of an injury of a passenger resulting from a secondary collision or the like is caused.

SUMMARY OF THE INVENTION

The present invention has been achieved in view of the above problem, and an object thereof is to provide the impact absorber capable of obtaining the load-displacement characteristic having a smooth initial rise.

In order to achieve the above object, a first aspect of the present invention provides an impact absorber including: an energy absorbing member formed of a composite material obtained by reinforcing a resin with a fiber, and for absorbing impact energy by being crushed in a predetermined crush direction; and a pressing member disposed on one end side in the crush direction of the energy absorbing member, and for pressing the energy absorbing member in the crush direction to thereby crush the energy absorbing member. In the impact absorber, the energy absorbing member is configured by stacking, along a direction orthogonal to the crush direction, fiber layers having different elastic moduli to a load along the crush direction, and one end portion in the crush direction is inclined relative to a pressing surface of the pressing member such that the fiber layers are gradually brought into contact with the pressing member sequentially in ascending order of the elastic modulus as the energy absorbing member is pressed by the pressing member.

The pressing surface of the pressing member may be formed in a flat shape orthogonal to the crush direction, the energy absorbing member may be formed in a cylindrical shape having a central axis along the crush direction, the fiber layers may be each formed in a cylindrical shape, stacked along a radial direction of the energy absorbing member, and configured such that the elastic modulus of the fiber layer is reduced as the fiber layer approaches an inner periphery, and the one end portion in the crush direction may be formed in a tapered shape in which a position of the one end portion is shifted to the one end side in the crush direction with approach to the inner periphery.

The pressing surface of the pressing member may be formed in a flat shape orthogonal to the crush direction, the energy absorbing member may be formed in a cylindrical shape having a central axis along the crush direction, the fiber layers may be each formed in a cylindrical shape, stacked along a radial direction of the energy absorbing member, and configured such that the elastic modulus of the fiber layer is reduced as the fiber layer approaches a thick center of the energy absorbing member, and the one end portion in the crush direction may be formed in a shape in which a position of the one end portion is shifted to the one end side in the crush direction with approach to the thick center of the energy absorbing member.

The composite material may be a carbon fiber reinforced plastic.

BRIEF DESCRIPTION OF THE DRAWINGS

FIG. 2A is a cross-sectional view of the impact absorber in the implementation, and FIG. 2B is an enlarged view of a C portion of FIG. 2A;

FIG. 6 shows a schematic representation of diffrent directions of fiber orientation.

DETAILED DESCRIPTION

Hereinbelow, an implementation of the present invention will be described with reference to the drawings.

Figure 1:
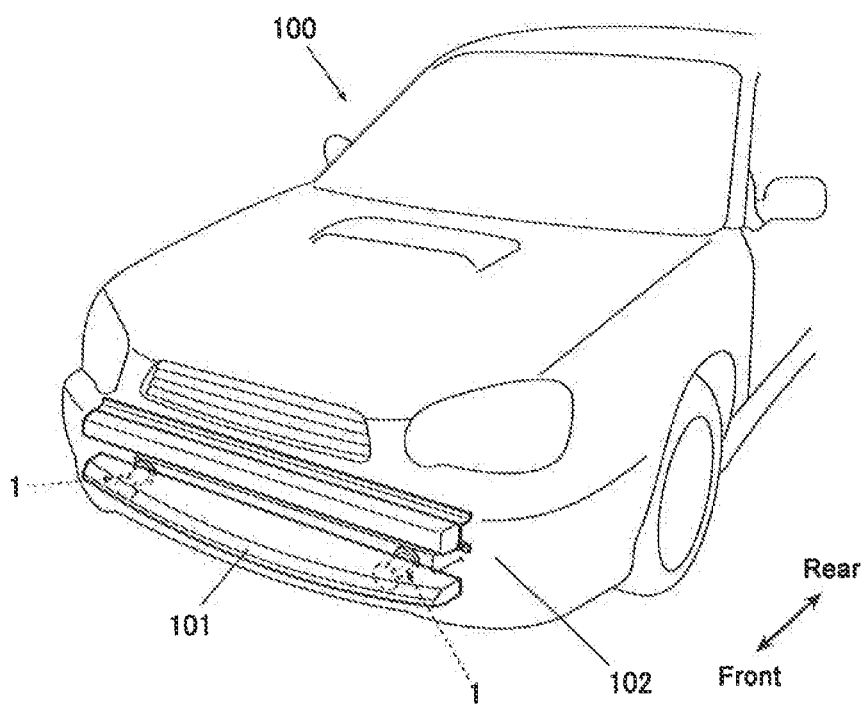
FIG. 1 is a perspective view of a vehicle on which an impact absorber in an implementation is mounted.

FIG. 1 is a perspective view of a vehicle 100 on which an impact absorber 1 in the present implementation is mounted, FIG. 2A is a cross-sectional view of the impact absorber 1, and FIG. 2B is an enlarged view of a C portion of FIG. 2A.

As illustrated in FIG. 1, two impact absorbers 1 are disposed side by side between a bumper beam 101 and a body frame 102 of the vehicle (automobile) 100, and absorb an impact from the front of the vehicle.

Note that, in the following description, the description of "front" and "rear" means directions as viewed from the vehicle 100 on which the impact absorber 1 is mounted unless otherwise specified.

Specifically, as illustrated in FIG. 2A, the impact absorber 1 includes a crush box 2, a pressing member 3 that presses the crush box 2, and a supporting member 4 that supports the crush box 2.

Among them, the crush box 2 is an energy absorbing member according to the present invention, and is formed of fiber reinforced plastics (FRP) as a composite material obtained by reinforcing a resin with a fiber. The type of the fiber includes carbon fiber, glass fiber, basalt fiber, and aramid fiber, and it is preferable to use the carbon fiber excellent in energy absorption amount and strength. The crush box 2 absorbs impact energy by being pressed from the front by the pressing member 3 having received an impact load and crushed in a front-rear direction.

Specifically, the crush box 2 is formed in a cylindrical shape having a central axis Ax along the front-rear direction. More specifically, as illustrated in FIG. 2B, the crush box 2 has a layer structure in which fiber layers 21, . . . each formed in a cylindrical shape are stacked along a radial direction of the crush box 2. The fiber layers 21, . . . have different elastic moduli to a load (compressive load) along the front-rear direction (hereinafter referred simply as an "elastic modulus"). In the present implementation, the elastic modulus of the fiber layer is reduced as the fiber layer approaches the inner periphery of the crush box 2. The fiber layers 21, . . . have different directions of orientation of a fiber that is wound in a circumferential direction so that they have different elastic moduli. That is, as schematically illustrated in FIG. 6, among the fiber layers 21, . . . , in the fiber layer 21 closer to the inner periphery (lower elastic modulus), the fiber is inclined so as to be more orthogonal to the front-rear direction and, in the fiber layer 21 closer to an outer periphery (higher elastic modulus), the fiber stands so as to be more parallel to the front-rear direction.

In addition, the front end portion of the crush box 2 on the side of the pressing member 3 is formed in a tapered shape in which the position of the front end portion is shifted toward the front with approach to the inner periphery. Accordingly, as the crush box 2 is pressed by the pressing member 3, the fiber layers 21, . . . are gradually brought into contact with the pressing member 3 sequentially from the fiber layer on the inner periphery side (i.e., the fiber layer having the low elastic modulus) to the fiber layer on the outer periphery side (i.e., the fiber layer having the high elastic modulus), as will be described later.

As illustrated in FIG. 2A, the pressing member 3 is used to press and crush the crush box 2, is formed in a substantially flat shape orthogonal to the front-rear direction, and is disposed so as to be in contact with the front end surface of the crush box 2 (the innermost fiber layer 21) over the entire circumference thereof. That is, the flat rear surface of the pressing member 3 orthogonal to the front-rear direction serves as a pressing surface that presses the crush box 2. In addition, the pressing member 3 also serves as the attachment portion of the impact absorber 1 to the vehicle 100, and is attached to the bumper beam 101 such that its front surface is in contact with the rear surface of the bumper beam 101 of the vehicle 100 (see FIG. 1). Accordingly, as will be described later, the pressing member 3 receives an impact load applied from the front via the bumper beam 101, and presses the crush box 2 from the front along the front-rear direction to thereby crush the crush box 2. Note that an example of a method for fixing the crush box 2 to the bumper beam 101 includes a method in which a contact pressure is caused between the crush box 2 and the pressing member 3 by binding the pressing member 3 and the supporting member 4 together using a bolt and the crush box 2 is thereby fixed to the bumper beam 101.

The supporting member 4 is used to support the crush box 2, is formed in a substantially flat shape orthogonal to the front-rear direction, and is disposed so as to be in contact with the rear end surface of the crush box 2 over the entire circumference thereof. In addition, the supporting member 4 also serves as the attachment portion of the impact absorber 1 to the vehicle 100, and is attached to the body frame 102 such that its rear surface is in contact with the front surface of the body frame 102 of the vehicle 100 (see FIG. 1).

In the impact absorber 1 having the above-described configuration, for example, when the vehicle 100 on which the impact absorber 1 is mounted collides with an object in front, the impact load from the front is applied to the pressing member 3 via the bumper beam 101. Subsequently, the pressing member 3 having received the impact load presses the crush box 2 from the front along the front-rear direction.

Figure 3:
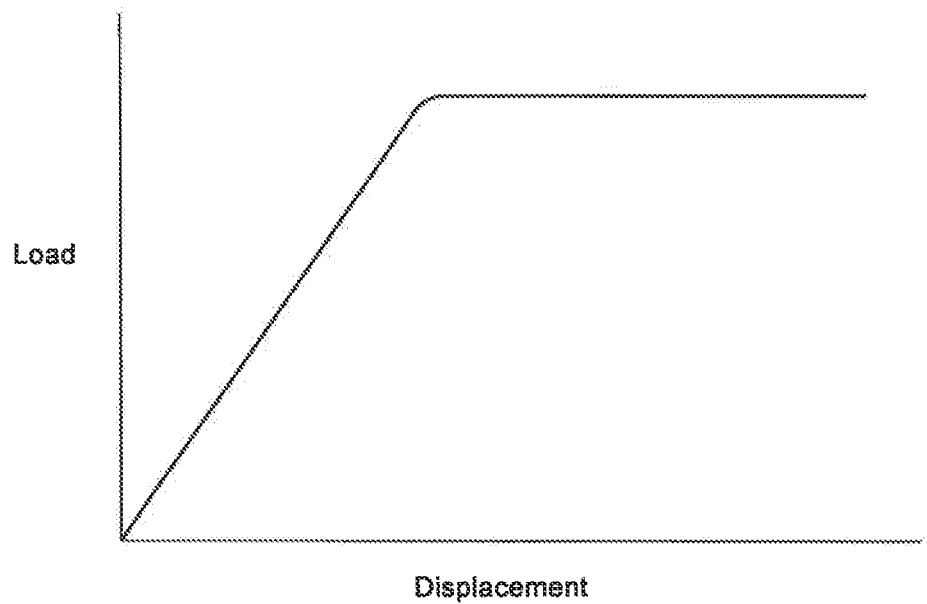
FIG. 3 is a load-displacement diagram of the impact absorber in the implementation.

The pressing member 3 presses the front end portion of the crush box 2 from the front first. At this point, the front end portion of the crush box 2 is formed in the tapered shape in which the position of the front end portion is shifted toward the front with approach to the inner periphery, i.e., the front end portion thereof is inclined relative to the pressing surface of the pressing member 3 formed in the flat shape orthogonal to the front-rear direction. Accordingly, as the front end portion of the crush box 2 is pressed by the pressing member 3, the front end portion thereof is brought into contact with the pressing member 3 gradually widely from the inner periphery side to the outer periphery side. That is, in the front end portion of the crush box 2, the fiber layers 21, . . . are gradually brought into contact with the pressing member 3 sequentially in ascending order of the elastic modulus and pressed, and hence the net elastic modulus of the crush box 2 in a pressed portion (contact portion) is gradually increased as the crush box 2 is pressed by the pressing member 3. As a result, the load proportional to the elastic modulus is also gradually increased with an increase in the displacement (deformation amount) of the crush box 2 in the front-rear direction, and the load-displacement characteristic at this point has a smooth initial rise, as illustrated in FIG. 3.

Thereafter, the completely cylindrical portion of the crush box 2 is gradually pressed and crushed by the pressing member 3 after the front end portion thereof is completely pressed, and the displacement progresses at nearly a constant load during the crush of the completely cylindrical portion thereof. In this process, the fiber is ruptured from a portion directly pressed by the pressing member 3, and the crush box 2 is gradually crushed while rupture pieces are divided into those inside the crush box 2 and those outside the crush box 2 that are rolled rearward. As a result, the impact energy is absorbed with the crush of the crush box 2, and the impact load is cushioned.

As described thus far, according to the impact absorber 1 of the present implementation, the crush box 2 that is crushed in the front-rear direction is configured by stacking the fiber layers 21, . . . having different elastic moduli along the radial direction orthogonal to the front-rear direction, and the front end portion that is pressed first by the pressing member 3 is inclined relative to the pressing surface of the pressing member 3 such that the fiber layers 21, . . . are gradually brought into contact with the pressing member 3 sequentially in ascending order of the elastic modulus as the crush box 2 is pressed by the pressing member 3. With this, the net elastic modulus of the crush box 2 in the pressed portion (contact portion) during initial pressing is gradually increased as the crush box 2 is pressed by the pressing member 3. Consequently, the load proportional to the elastic modulus is also gradually increased with the increase in the displacement of the crush box 2 in the front-rear direction and, by extension, it is possible to obtain the load-displacement characteristic having the smooth initial rise.

[Modification]

Next, a modification of the above-described implementation will be described. Note that the same components as those of the above-described implementation are designated by the same reference numerals and the description thereof will be omitted.

Figure 4A:
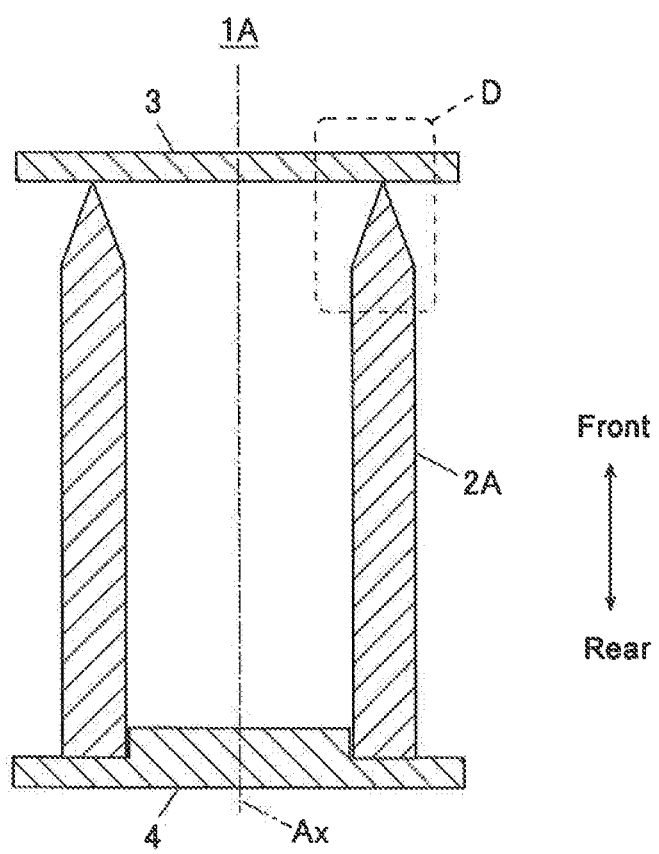
FIG. 4A is a cross-sectional view of an impact absorber in a modification of the implementation.
Figure 4B:
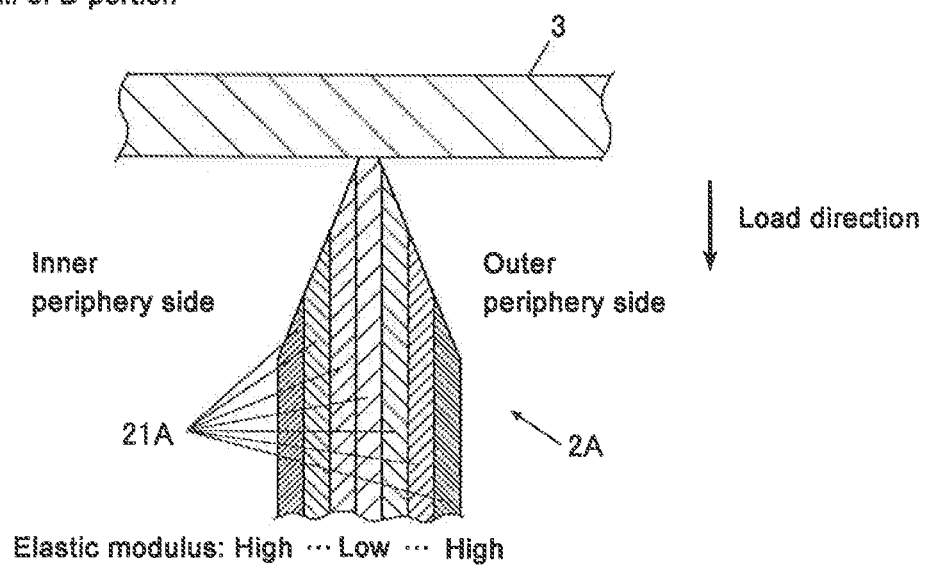
FIG. 4B is an enlarged view of a D portion of FIG. 4A.
Figure 5:
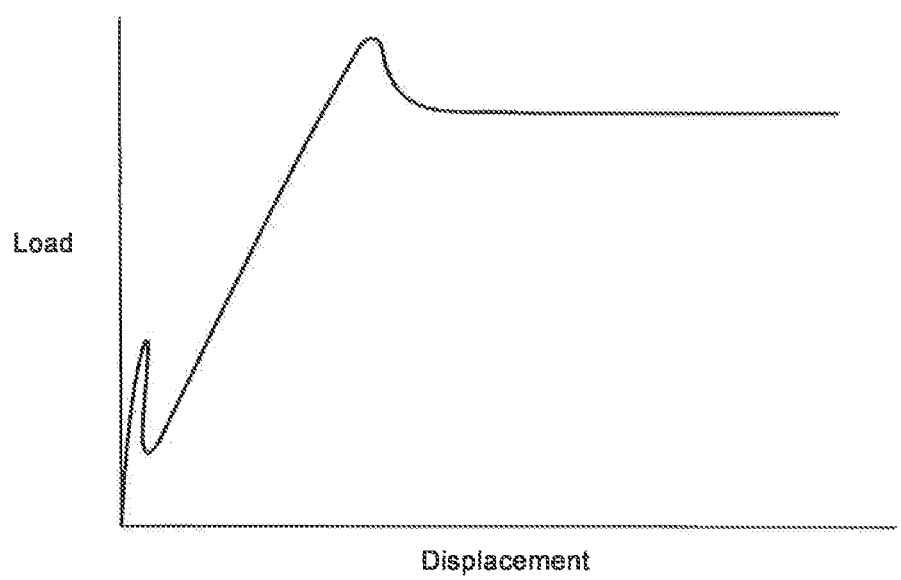
FIG. 5 is a load-displacement diagram of a conventional impact absorber.

FIG. 4A is a cross-sectional view of an impact absorber 1A in the present modification, and FIG. 4B is an enlarged view of a D portion of FIG. 4A.

As illustrated in FIG. 4A, instead of the crush box 2 in the above-described implementation, the impact absorber 1A includes a crush box 2A having the shape of the front end portion and the layer structure of the fiber layer that are different from those of the crush box 2.

The crush box 2A is formed in a cylindrical shape having the central axis Ax along the front-rear direction. More specifically, as illustrated in FIG. 4B, the crush box 2A has a layer structure in which fiber layers 21A, . . . each formed in a cylindrical shape are stacked along the radial direction of the crush box 2A. The fiber layers 21A, . . . have different elastic moduli. In the present modification, the elastic modulus of the fiber layer is reduced as the fiber layer approaches the thick center of the crush box 2, and the elastic modulus of the fiber layer is increased as the fiber layer approaches the inner periphery or the outer periphery. In addition, in the crush box 2A, the front end portion on the side of the pressing member 3 is formed in a shape having a bowl-like cross section in which the position of the front end portion thereof is shifted toward the front with approach to the thick center of the crush box 2A.

With the configuration described above, similarly to the crush box 2 in the above-described implementation, as the crush box 2A is pressed by the pressing member 3, the fiber layers 21A, . . . are gradually brought into contact with the pressing member 3 sequentially in ascending order of the elastic modulus. Note that the configuration of the crush box 2A is otherwise the same as that of the crush box 2 in the above-described implementation.

According to the impact absorber 1A of the present modification as well, it is possible to obtain the same effects as those of the impact absorber 1 of the above-described implementation.

[Other Modifications]

Note that the implementation to which the present invention can be applied is not limited to the implementation and the modification described above, and the implementation can be appropriately changed without departing from the gist of the present invention.

For example, the crush box 2 (2A) may be appropriately configured such that the fiber layers 21, . . . (21A, . . . ) are gradually brought into contact with the pressing member 3 sequentially in ascending order of the elastic modulus as the crush box 2 (2A) is pressed by the pressing member 3. That is, in the front end portion of the crush box 2, the fiber layer 21 having a lower elastic modulus may be appropriately positioned at the front of the fiber layer 21 having a higher elastic modulus. Consequently, the fiber layers 21 may be configured such that the elastic modulus of the fiber layer 21 is reduced as the fiber layer 21 approaches the outer periphery, and the front end portion of the crush box 2 may be formed in a tapered shape in which the position of the front end portion is shifted toward the front with approach to the outer periphery. However, in the case where the above configuration is adopted, the load in a stable load region is reduced and the energy absorption amount is reduced correspondingly. Consequently, it is preferable that the elastic modulus of the outermost fiber layer 21 of the crush box 2 be not the lowest elastic modulus.

In addition, the front end portion of the crush box 2 (2A) may be appropriately inclined relative to the pressing surface of the pressing member 3 such that the fiber layers 21, . . . (21A, . . . ) are gradually brought into contact with the pressing member 3 sequentially in ascending order of the elastic modulus as the crush box 2 (2A) is pressed by the pressing member 3, and the front end portion thereof is not necessarily inclined relative to the front-rear direction. That is, the front end portion (front end surface) of the crush box 2 (2A) may be formed into a flat surface orthogonal to the front-rear direction, and the pressing surface of the pressing member 3 may be inclined.

Further, the shape of the crush box 2 (2A) is not limited to the cylindrical shape, and may be, e.g., a cylindrical column shape, a conical shape, a prism shape, or a pyramid shape.

Furthermore, the impact absorber according to the present invention is not limited to the impact absorber mounted on the vehicle (automobile), and can be suitably used as, e.g., the impact absorber that is mounted on a helicopter and absorbs the impact during landing.

The invention claimed is:

1. An impact absorber comprising:
an energy absorbing member formed of a composite material obtained by reinforcing a resin with a fiber, and for absorbing impact energy by being crushed in a predetermined crush direction; and
a pressing member formed in a flat shape orthogonal to the crush direction, and disposed on one end side in the crush direction of the energy absorbing member, and for pressing the energy absorbing member in the crush direction to thereby crush the energy absorbing member, wherein
the energy absorbing member is configured by stacking, along a direction orthogonal to the crush direction, fiber layers having different elastic moduli to a load along the crush direction such that one end portion of the energy absorbing member, which comprises respective exposed ends of the fiber layers, is exposed along the crush direction; and
wherein fiber layers in the stack that are positioned closer to an inner periphery of the energy absorbing member feature fibers that are inclined as to be more orthogonal to the crush direction, and fiber layers in the stack that are positioned closer to an outer periphery are inclined as to be more parallel to the crush direction such that there is provided an ascending order of elastic modulus in a radially outward direction from fiber layers in the stack that are positioned closer to the inner periphery to fiber layers in the stack that are positioned closer to the outer periphery.

2. The impact absorber according to claim 1, wherein
the energy absorbing member is formed in a cylindrical shape having a central axis along the crush direction;
the fiber layers are each formed in a cylindrical shape, stacked along a radial direction of the energy absorbing member, and configured such that the elastic modulus of the fiber layer is reduced as the fiber layer approaches the inner periphery; and
the one end portion is formed in a tapered shape in which a position of the respective exposed fiber ends of the one end portion are shifted toward the one end side in the crush direction with approach to the inner periphery.

3. The impact absorber according to claim 2, wherein the composite material is a carbon fiber reinforced plastic.

4. The impact absorber according to claim 1, wherein
the energy absorbing member is formed in a cylindrical shape having a central axis along the crush direction;
the fiber layers are each formed in a cylindrical shape, stacked along a radial direction of the energy absorbing member, and configured such that the elastic modulus of the fiber layer is reduced as the fiber layer approaches a thick center of the energy absorbing member; and
the one end portion is formed in a shape in which a position of the respective exposed fiber ends of the one end portion are shifted toward the one end side in the crush direction with approach to the thick center of the energy absorbing member.

5. The impact absorber according to claim 4, wherein the composite material is a carbon fiber reinforced plastic.

6. The impact absorber according to claim 1, wherein the composite material is a carbon fiber reinforced plastic.

7. The impact absorber of claim 1 wherein the most internally positioned fiber layer of the energy absorbing member is in initial contact with the pressing member at the one end side, and the exposed ends of the fiber layers define an incline in the one end portion of the energy absorbing member that slopes radially out and down.

8. The impact absorber of claim 1 wherein a fiber layer in an intermediate region of the energy absorbing member is in initial contact with the pressing member at the one end side, and the exposed ends of the fiber layers define a pair of inclined exposed surfaces on the one end portion.

9. The impact absorber of claim 1 wherein the ascending order of the elastic modulus comprises different orientations in fibers in the respective layers, wherein a more internally positioned one of the fiber layers has a fiber orientation at 90° relative to a central axis extending in the crush direction, and a more radially outward fiber layer has a fiber orientation at 0° relative to said central axis.

10. The impact absorber of claim 1 wherein, in a direction radial out in the stack of fiber layers from the more inside to the more outside, there is a continuous, uninterrupted ascending increase in the elastic modulus.

11. The impact absorber of claim 1 wherein the one end portion is inclined relative to the pressing surface of the pressing member such that the fiber layers are gradually brought into contact with the pressing member sequentially in ascending order of the elastic modulus as the energy absorbing member is pressed by the pressing member in the crush direction.

12. The impact absorber of claim 11 wherein the sequential ascending order is continuous and without interruption relative to the stacked layers.

13. The impact absorber of claim 1 wherein the stacked fiber layers have substantially the same thickness.

14. The impact absorber of claim 1, wherein the pressing member crushes the energy absorbing member against a supporting member positioned on a second end side in the crush direction of the energy absorbing member, and the respective elastic module value for the different fiber layers is consistent over the full length of the impact absorber in the crush direction between the pressing member and the supporting member.

15. An impact absorber comprising:
an energy absorbing member formed of a composite material that is comprised of reinforcing resin with fiber, and for absorbing impact energy by being crushed in a predetermined crush direction; and
a pressing member disposed on one end side in the crush direction of the energy absorbing member, and for pressing the energy absorbing member in the crush direction to thereby crush the energy absorbing member, wherein
the energy absorbing member is comprised of a laminate stack of composite fiber layers with the fiber layers having respective, exposed ends at the one end side that extend along the crush direction, and
the fiber layers, along a direction orthogonal to the crush direction, have different elastic moduli to a load along the crush direction, and
the exposed ends of the fiber layers are arranged in stepped fashion, such that an exposed end of a more radially outward positioned fiber layer is farther from the pressing member than an exposed end of a more radially internally positioned one of the fiber layers, and the elastic moduli of the laminate stack of fiber layers increase in stepped sequence in going from the more radially internally positioned fiber layer to the more radially outward positioned fiber layer such that fiber layers in the laminate stack are gradually brought into contact with the pressing member sequentially in ascending order of the elastic modulus as the energy absorbing member is crushed by the pressing member, and wherein the stepped sequence of increasing elastic moduli comprises different orientations in fibers of the respective layers, wherein the more internally positioned one of the fiber layers has a fiber orientation at or closer to 90° relative to said central axis and the more radially outward fiber layer has a fiber orientation at or closer to 0° relative to said central axis.

16. The impact absorber of claim 15 wherein the most internally positioned fiber layer of the energy absorbing member is in initial contact with the pressing member.

17. The impact absorber of claim 15 wherein the said more radially internally positioned fiber layer is positioned, relative to the direction orthogonal to the crush direction, in an intermediate region of the energy absorbing member.

18. The impact absorber of claim 15, wherein the pressing member crushes the energy absorbing member against a supporting member positioned on a second end side in the crush direction of the energy absorbing member, and the respective elastic module value for the different fiber layers is consistent over the full length of the impact absorber in the crush direction between the pressing member and the supporting member.

19. An impact absorber comprising:
an energy absorbing member formed of a composite material obtained by reinforcing a resin with a fiber, and for absorbing impact energy by being crushed in a predetermined crush direction; and
a pressing member disposed on one end side in the crush direction of the energy absorbing member, and for pressing the energy absorbing member in the crush direction to thereby crush the energy absorbing member against a supporting member positioned on a second end side in the crush direction of the energy absorbing member, wherein
the energy absorbing member is configured by stacking, along a direction orthogonal to the crush direction, fiber layers having different elastic moduli to a load along the crush direction over the full length in the crush direction such that one end portion of the energy absorbing member, which comprises respective exposed ends of the fiber layers, is exposed along the crush direction; and
the one end portion is inclined relative to a pressing surface of the pressing member such that the fiber layers are gradually brought into contact with the pressing member sequentially in ascending order of the elastic modulus as the energy absorbing member is pressed by the pressing member in the crush direction, with the respective elastic module modulus value for the different fiber layers being consistent over the full length of the impact absorber in the crush direction between the pressing member and the supporting member, and wherein the fiber layers have a stepped sequence of increasing elastic moduli based on different orientations in fibers of the respective layers, wherein the more internally positioned one of the fiber layers has a fiber orientation at or closer to 90° relative to said central axis and the more radially outward fiber layer has a fiber orientation at or closer to 0° relative to said central axis.

20. The impact absorber of claim 19 wherein there is a continuous, uninterrupted ascending increase in the elastic modulus that is based on a continuous increase toward a direction of parallel orientation in the fibers in going from a position more radially inside toward a position that is more radially outside relative to the stacked fiber layers.

* * * * *